United States Patent [19]

Cooper, Jr.

[11] 4,283,597
[45] Aug. 11, 1981

[54] WIDE-RANGE INSULATING/SEALING SLEEVE

[75] Inventor: James J. Cooper, Jr., St. Louis, Mo.

[73] Assignee: International Telephone and Telegraph Corporation, New York, N.Y.

[21] Appl. No.: 21,929

[22] Filed: Mar. 19, 1979

[51] Int. Cl.$^3$ .................... H01B 17/58; H01R 13/52
[52] U.S. Cl. .............................. 174/138 F; 277/208; 277/212 FB; 339/116 C; 339/213 R
[58] Field of Search ................ 174/72 R, 77 R, 77 S, 174/91, 93, 138 F; 339/26, 36, 60 R, 60 M, 101, 116 R, 116 C, 209, 213 R, 242; 277/208, 212 FB

[56] References Cited

U.S. PATENT DOCUMENTS

| | | | |
|---|---|---|---|
| 3,480,905 | 11/1969 | Toedtman | 174/72 R X |
| 3,483,310 | 12/1969 | Krup | 174/87 |
| 3,528,051 | 9/1970 | Toedtman et al. | 174/138 F X |
| 3,710,307 | 1/1973 | Cooper, Jr. | 339/116 C |
| 3,740,692 | 6/1973 | Filhaber | 174/72 R X |
| 3,816,642 | 6/1974 | Toedtman et al. | 174/138 F |

Primary Examiner—Laramie E. Askin
Attorney, Agent, or Firm—James B. Raden; William J. Michals

[57] ABSTRACT

An insulating and sealing sleeve for use with bus bar connectors of underground power distribution systems. The sleeve includes a generally cylindrical elastomeric body having internal sealing rings at one end thereof for sealingly engaging the bus bar and a reentrant and generally flexible constricted portion at the other end thereof. The axially inner end of the reentrant portion includes a tubular portion which extends axially outwardly and joining a tapered portion which flares outwardly and which terminates at the other end of the sleeve. The internal surface of the reentrant portion includes a plurality of grooves along the tubular and flared contours and which sealingly engage the insulation portion of a conductor which is mechanically fastened and electrically connected to the bus bar. The internally tapered grooved portion accommodates a relatively wide range of conductor sizes and the tubular portion ensures that a plurality of grooves will sealingly engage the minimum conductor size. The tapered portion also permits the insulated portion of the conductor to partially enter the sleeve before the stretching operation of the installation begins.

7 Claims, 4 Drawing Figures

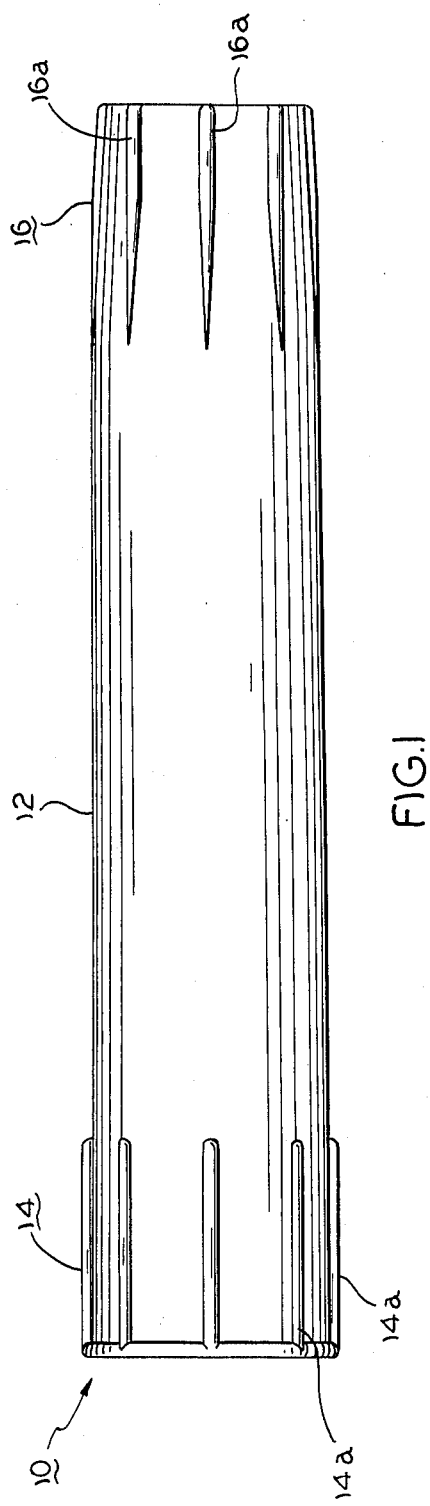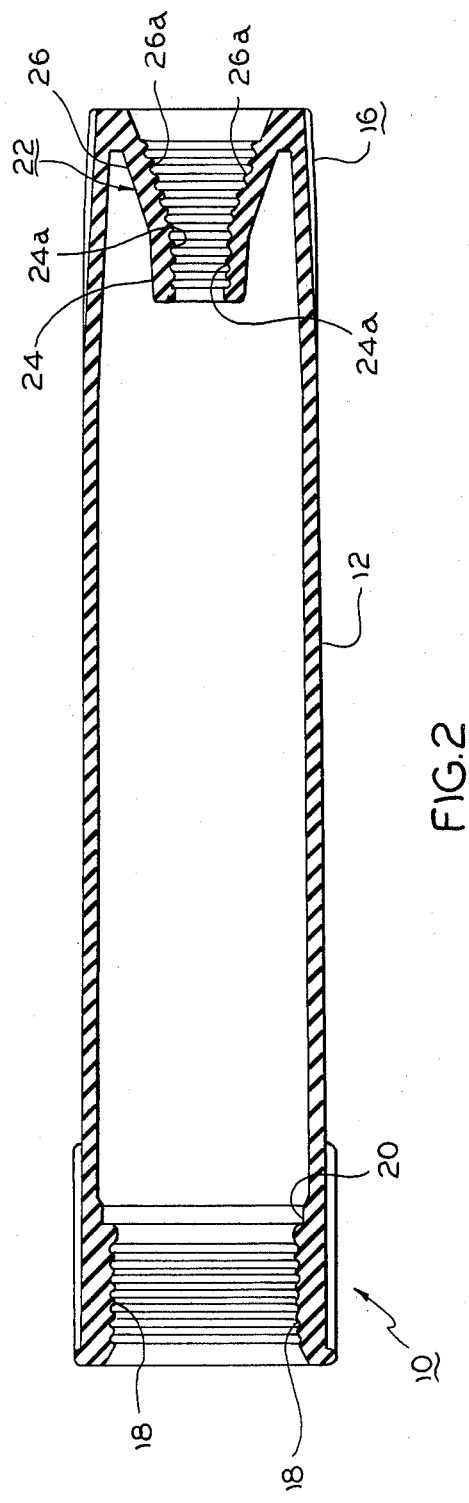

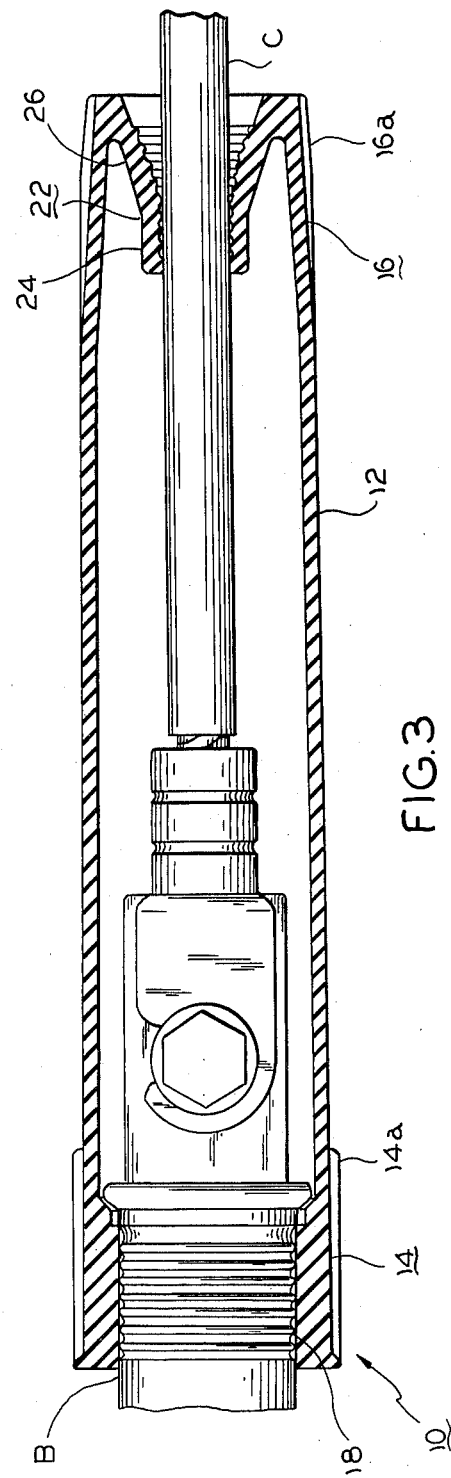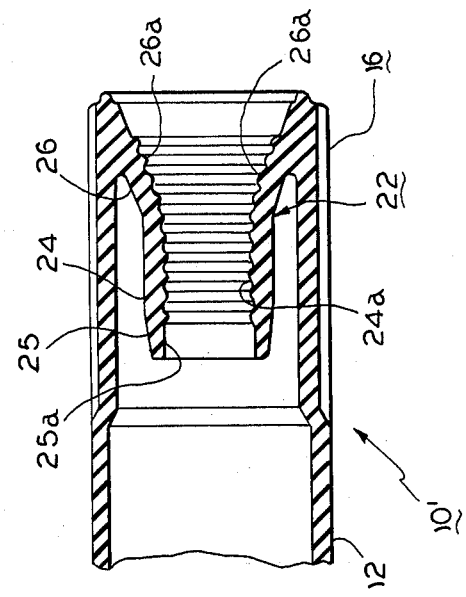

WIDE-RANGE INSULATING/SEALING SLEEVE

BACKGROUND OF THE INVENTION

This invention relates to an insulating and sealing sleeve for use with bus bar connectors of underground power distribution systems and the like.

Insulating and sealing sleeves are known and have been widely used in the art. Insulating and sealing sleeves of this type are exemplified in U.S. Pat. No. 3,528,051 which is assigned to the same assignee as the present invention. These sleeves provide a waterproof connection between the insulated portion of an electrical conductor and the tang of a bus bar which interconnects two or more conductors of the power distribution system. These sleeves utilize a closure wall means at the conductor end of the sleeve for embracingly engaging the conductor coaxially and providing a seal with the conductor. The other end of the sleeve body includes a relatively flexible portion which is of a tubular shape and smaller in size than the cooperating terminal or bus bar tang to provide a pressure contact therewith. While these sleeves have worked quite well and have enjoyed commercial success, it has been found that a relatively large number of different size sleeves are required to accommodate the differing sizes or diameters of the various conductors used in power distribution systems. Accordingly, they have been rather expensive to manufacture as a number of molds are required to produce the sleeves of varying sizes and the inventories required to stock the various sizes are also extensive.

These and other disadvantages are overcome by the present invention wherein there is provided an insulating and sealing sleeve for use with bus bar connectors and which is further provided with a conductor sealing end which accommodates a relatively wide range of conductor sizes. Further, the improvement provided by the present invention also facilitates the initial installation of the sleeve onto the insulated portion of the electrical conductor.

SUMMARY OF THE INVENTION

Briefly, a sleeve for sealing and insulating the connection of a insulated power distribution system cable to an insulated bus bar is provided. The sleeve includes a generally cylindrical hollow body of elastomeric material having a plurality of circumferentially extending and axially closely spaced grooves at one end thereof for stretchingly and sealingly engaging an insulated projecting tang portion of the bus bar. The other end of the body includes a reentrant portion including an axially inner tubular portion and a flared portion joining the tubular portion and opening outwardly toward and terminating at the edge of the other end of the body. The internal surfaces of the tubular and flared portions include a plurality of circumferentially extending and axially spaced grooves for sealingly engaging the insulated portion of the conductor wherein the diameters of the grooves along the tubular portion are substantially constant and wherein the diameters of the grooves along the flared portion increase in the axially outward direction.

BRIEF DESCRIPTION OF THE DRAWING

The advantages of this invention will become more readily appreciated as the same becomes completely understood by reference to the following detailed description when taken in conjunction with the accompanying drawing wherein:

FIG. 1 is a plan view of the insulating and sealing sleeve for use with bus bar connectors in accordance with the present invention;

FIG. 2 is a cross-sectional view of the sleeve of FIG. 1;

FIG. 3 is a cross-sectional view of the sleeve in accordance with the principles of the present invention shown in conjunction with the depending tang of a bus bar connector and an electrical connector which is mechanically and electrically connected to the bus bar tang; and, FIG. 4 is a partial cross-sectional view of a modified sleeve in accordance with an alternate embodiment of the present invention.

DETAILED DESCRIPTION

Referring now to FIG. 1 there is shown generally at 10 an insulating and sealing sleeve in accordance with the teachings of the present invention. Sleeve 10 includes a generally cylindrical hollow body 12 of a flexible elastomeric insulating material. The bus bar connector end 14 of sleeve 10 includes a plurality of longitudinally extending and circumferentially spaced ribs 14a. The conductor engaging end 16 of sleeve 10 similarly includes a plurality of longitudinally extending and circumferentially spaced ribs 16a. The function of ribs 14a and 16a will be explained more fully hereinafter.

Referring now to FIG. 2 there is shown a cross-sectional view of the sleeve 10 of FIG. 1. The bus bar connector end 14 of sleeve 10 includes a plurality of circumferentially extending and axially closely spaced grooves 18 on the internal radially inwardly facing wall surface thereof. Grooves 18 function to stretchingly and sealingly engage an insulated projecting tang portion of the associated bus bar connector. Bus bar connector end 14 also includes a stepped portion 20 on the internal surface portion thereof for engaging a corresponding radially outwardly projecting ring portion of the pending tang of the associated bus bar connector as illustrated in FIG. 3.

The conductor engaging end 16 of sleeve 10 includes a reentrant portion 22 comprising an axially inner tubular portion 24 and a linearly tapered flared portion 26 which joins tubular portion 24 and opens outwardly toward the terminating edge of the conductor engaging end 16 of the body 12 of sleeve 10. The internal surfaces of tubular portion 24 and flared portion 26 respectively include a plurality of circumferentially extending and axially spaced grooves 24a and 26a for sealingly engaging the insulated portion of the conductor as best illustrated in FIG. 3. It should be noted that the diameters of grooves 24a along tubular portion 24 are substantially constant whereas the diameters of the grooves 26a along flared portion 26 increase in the axially outward direction. The internally tapered groove portion accommodates a relatively wide range of conductor sizes which in currently preferred commercial embodiments spans a range of two to one. Further, by providing an elongated tubular portion 24 wherein the diameters of grooves 24a are substantially constant, this structure insures that a plurality of grooves will necessarily engage the minimum selected conductor size. It will also be appreciated by those skilled in the art that the tapered or flared portion 26 also permits the insulated portion of the conductor to partially enter the sleeve before the stretching operation of the installation begins. That is, flared portion 26 particularly at the axially outer end thereof, serves as a funnel guide for coaxially aligning and engaging the insulated portion of the associated conductor prior to the stretching operation. Finally, as previously alluded to, the external ribs 14a and 16a provide external gripping surfaces to facilitate the manual installation of the sleeve respectively over the tang portion of the bus bar and the insulated portion of the conductor. As illustrated, sleeve 10 includes eight equally spaced ribs at each of the opposite end portions; and in a preferred embodiment each of the tapered and tubular portions includes at least four equally spaced grooves.

Turning now to FIG. 3, there is shown sleeve 10 in conjunction with an exemplary electrical connection between an insulated conductor C and the attachment tang of a bus bar connector B. In this illustration, the diameter of conductor C and, more particularly, the insulation portion thereof approximates the mid-range conductor size. It can be seen that both the tubular portion 24 and approximately one-half of flared portion 26 are expanded radially outwardly coaxially of the conductor axis and in conformity with the conductor. It will be appreciated that a minimum conductor size would expand tubular portion 24 by a predetermined amount with little or no expansion or deformation of the flared portion 26; and, that the largest conductor size would deform substantially all of flared portion 26 in conformity with the cylindrical shape of the conductor.

Referring now to FIG. 4 there is shown a partial cross-sectional view of an alternate embodiment of the present invention. In the embodiment illustrated in FIG. 4, tubular portion 24 includes a generally tubular extension 25 which extends axially inwardly a predetermined distance. Extension 25 is provided with a generally cylindrical radially inward surface 25a the diameter of which is significantly greater than the minimum diameter of grooves 24a of tubular portion 24. This offset provides a stress relief portion of avoid stress concentrations which might otherwise provide a starting point for a splitting or tearing of tubular portion 24. That is, since surface 25a is stretched to a significantly lesser degree than grooved portion 24a, the resulting stress and strain is also significantly less.

What has been taught, then, is an insulating and sealing sleeve for use with bus bar connectors of power distribution systems and facilitating, notably, a wide range of conductor sizes in a single sleeve size. The form of the invention illustrated and described herein a preferred embodiment of these teachings. It is shown as an illustration of the inventive concepts, rather than by way of limitation, and it is pointed out that various alterations and modifications may be indulged in within the scope of the appended claims.

What is claimed is:

1. A sleeve for sealing and insulating the connection of an insulated power distribution system cable to an insulated bus bar comprising, in combination: a generally cylindrical hollow body of elastomeric material having a plurality of circumferentially extending and axially closely spaced grooves at one end thereof and on the inner surface thereof for stretchingly and sealingly engaging an insulated projecting terminal portion of said bus bar, the other end of said body having a reentrant portion including an axially inner tubular portion and a flared portion joining said tubular portion and opening outwardly toward and terminating adjacent the edge of said other end of said body, the internal surfaces of said tubular and flared portions having a plurality of circumferentially extending and axially spaced grooves for sealingly engaging an insulated portion of said cable, wherein the diameters of the grooves along said tubular portion are substantially constant and wherein the diameters of the grooves along said flared portion increase in the axially outward direction, with the largest diameter groove being spaced apart from said edge thereby forming a funnel guide therebetween, wherein said flared portion joins said tubular portion at a point which is substantially spaced from the axially inner end of said funnel guide and wherein the axially inward end of said tubular portion includes a tubular extension portion extending a given distance into said sleeve and having a generally cylindrical internal surface portion the diameter of which is significantly greater than the minimum diameter of said grooves of said tubular portion.

2. The sleeve according to claim 1, wherein the outer cylindrical surfaces of said sleeve at the opposite end portions thereof include a plurality of longitudinally extending and circumferentially spaced ribs respectively overlying the grooved portions of said sleeve to provide external gripping surfaces to facilitate the manual installation of said sleeve respectively over the terminal portion of said bus bar and an insulated portion of said cable.

3. The sleeve according to claim 2, wherein said sleeve includes eight equally spaced ribs at each of said opposite end portions.

4. The sleeve according to claim 1, wherein each of said flared and tubular portions includes at least four equally spaced grooves.

5. The sleeve according to claim 4, wherein said flared portion is linearly tapered and wherein said tubular portion is cylindrical.

6. The sleeve according to claim 5, wherein the diameter of said flared portion at said edge of said body is at least twice the diameter of the grooves along said cylindrical portion.

7. A sleeve for sealing and insulating the connection of an insulated power distribution system cable to an insulated bus bar comprising, in combination: a generally cylindrical hollow body of elastomeric material having a plurality of circumferentially extending and axially closely spaced grooves at one end thereof and on the inner surface thereof for stretchingly and sealingly engaging an insulated projecting terminal portion of said bus bar, the other end of said body having a reentrant portion including an axially inner tubular portion and a flared portion joining said tubular portion and opening outwardly toward and terminating adjacent the edge of said other end of said body, the internal surfaces of said tubular and flared portions having a plurality of circumferentially extending and axially spaced grooves for sealingly engaging an insulated portion of said cable, wherein the diameters of the grooves along said tubular portion are substantially constant and wherein the diameters of the grooves along said flared portion increase in the axially outward direction, with the largest diameter groove being spaced apart from said edge thereby forming a funnel guide therebetween, wherein said flared portion joins said tubular portion at a point which is substantially spaced from the axially inner end of said funnel guide.

* * * * *